May 24, 1960 J. BABAKIAN ET AL 2,938,178

CYCLIC CONTROL OF R.F. ENERGY TRANSMISSION AND RECEPTION

Filed May 8, 1956 3 Sheets-Sheet 1

INVENTORS.
JACOB BABAKIAN & JEROME H. BLOOM
BY Wade Koontz
and
Martin J. Finnegan
ATTORNEYS

CYCLIC CONTROL OF R.F. ENERGY TRANSMISSION AND RECEPTION

Filed May 8, 1956 3 Sheets-Sheet 2

INVENTORS
JACOB BABAKIAN & JEROME H. BLOOM
BY
Wade Koontz
Martin J. Finnegan
ATTORNEYS May 24, 1960 J. BABAKIAN ET AL 2,938,178

CYCLIC CONTROL OF R.F. ENERGY TRANSMISSION AND RECEPTION

Filed May 8, 1956 3 Sheets-Sheet 3

INVENTORS
JACOB BABAKIAN & JEROME H. BLOOM
BY
Wade Koontz and Martin J. Finnegan
ATTORNEYS 2,938,178

CYCLIC CONTROL OF R.F. ENERGY TRANSMISSION AND RECEPTION

Jacob Babakian, Winchester, and Jerome H. Bloom, Brookline, Mass., assignors to the United States of America as represented by the Secretary of the Air Force Filed May 8, 1956, Ser. No. 583,597

19 Claims. (Cl. 333—13)

(Granted under Title 35, U.S. Code (1952), sec. 266)

The invention described herein may be manufactured and used by or for the United States Government for governmental purposes without payment to us of any royalty thereon.

This invention relates to a system for the transmission and reception of radio frequency energy of very large magnitudes and more particularly to such systems utilizing a single antenna.

The invention provides a novel method and means for connecting such a single antenna to the transmitter and receiver in the proper sequence.

The advantages gained by the use of a single antenna for both transmission and reception of radio frequency energy are well known. One of the disadvantages, in some cases, is the difficulty of designing a good switch to connect the antenna to the transmitter, or to the receiver at the proper time. The problem becomes difficult when the transmitter power is increased by a large factor.

The aforementioned switch is commonly referred to as a duplexer. During transmission, the switch will effectively connect the transmitter to the single antenna and disconnect the receiver. Simultaneously, adequate protection must be provided for the receiver from the transmitted radio frequency energy. After transmission, the switch must effectively disconnect the transmitter from the single antenna and replace it with the receiver. Since the time involved in the switching operation is in the order of microseconds, electronic discharge tubes are preferable. Commonly, a duplexer comprises two switching tubes connected in a circuit with three transmission lines, one each for the transmitter, the receiver, and the antenna. The two electronic discharge tubes are usually referred to as transmit-receive and anti-transmit-receive tubes. These tubes are contained in TR and ATR resonant cavities as part of aforementioned circuit.

One type of system heretofore used rather extensively has included a combination of transmitter, receiver, single antenna, and duplexer interassociated in a suitable manner for the transmission and reception of radio frequency energy. The aforesaid system has encountered severe limitations in the past when the transmission power has approached large magnitudes, for example, in the order of three to four megawatts peak. The life of the transmit-receive and anti-transmit-receive tubes in a high power duplexer has been of very short duration and, consequently, the entire system operative time has been sharply reduced.

The method of operation constituting the present invention consists in directing the radio frequency energy to and from (sequentially) the antenna in a manner to produce the transmission and reception cycles in proper timed relationship without resort to energy flow interruption means involving the spark gaps or analogous devices heretofore required. More specifically, the successive transmission and reception cycles are established through the instrumentality of a gaseous medium which serves as an impedance varying control for the energy conducting path and thereby facilitates transfer of the R.-F. energy in opposite directions alternately, as required in echo detection or analogous operations.

Another feature of this invention is the provision of the transmit-receive and anti-transmit-receive device which has inherent therein the capacity to adapt itself to variations in the level of voltage prevailing at the control point in the coaxial line, the self adaptation being effective in such a manner that the device automatically seeks the point of maximum voltage and causes the transmit-receive and anti-transmit-receive cycling operation to occur, thereby maintaining the desired constancy characteristic.

In accordance with a preferred embodiment of the invention, a resonance responsive cyclic sprayer which operates to produce the required cycling of the radio frequency energy flow to and from the antenna by periodically establishing an electronic discharge in the form of a radiating spray of electrons spanning a surface area of substantial extent along the two cylindrical surfaces constituting the complementary coaxial components of the resonant cavity.

For a clear understanding of the manner by which the objects of the invention are achieved, reference may be had to the accompanying drawings illustrating a preferred embodiment of the invention, it being understood, however, that the specific illustration is for the purpose of disclosure only and places no limitation upon the invention.

Figure 1:
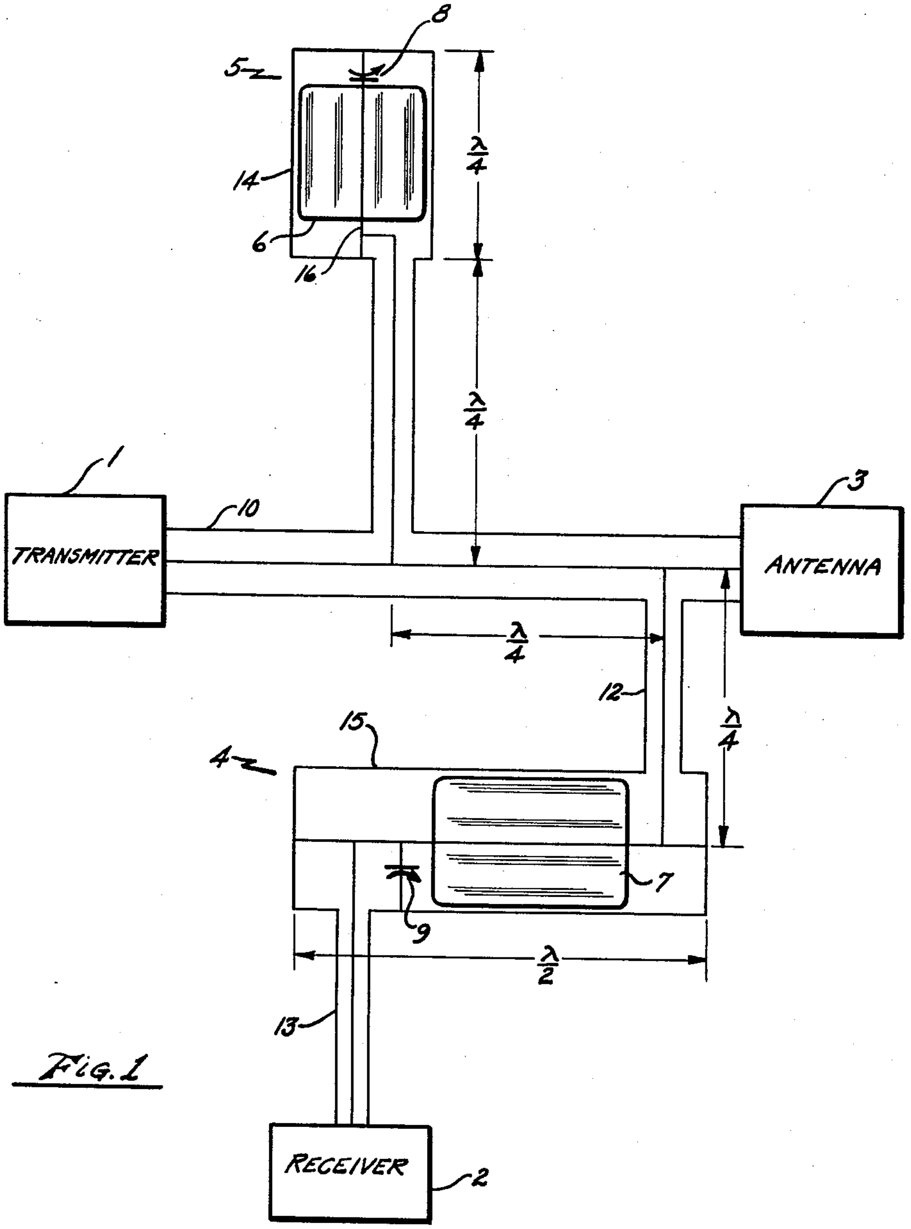
Figure 1 is a schematic representation of a system for the transmission and reception of radio frequency energy utilizing a single antenna which is in accordance with the invention.
Figure 3:
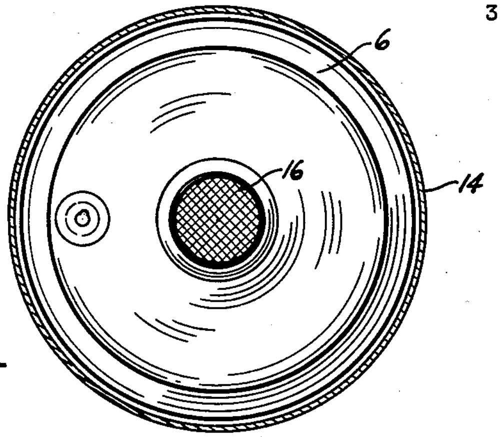
Figure 3 is a view along line 3—3 of Figure 2.
Figure 2:
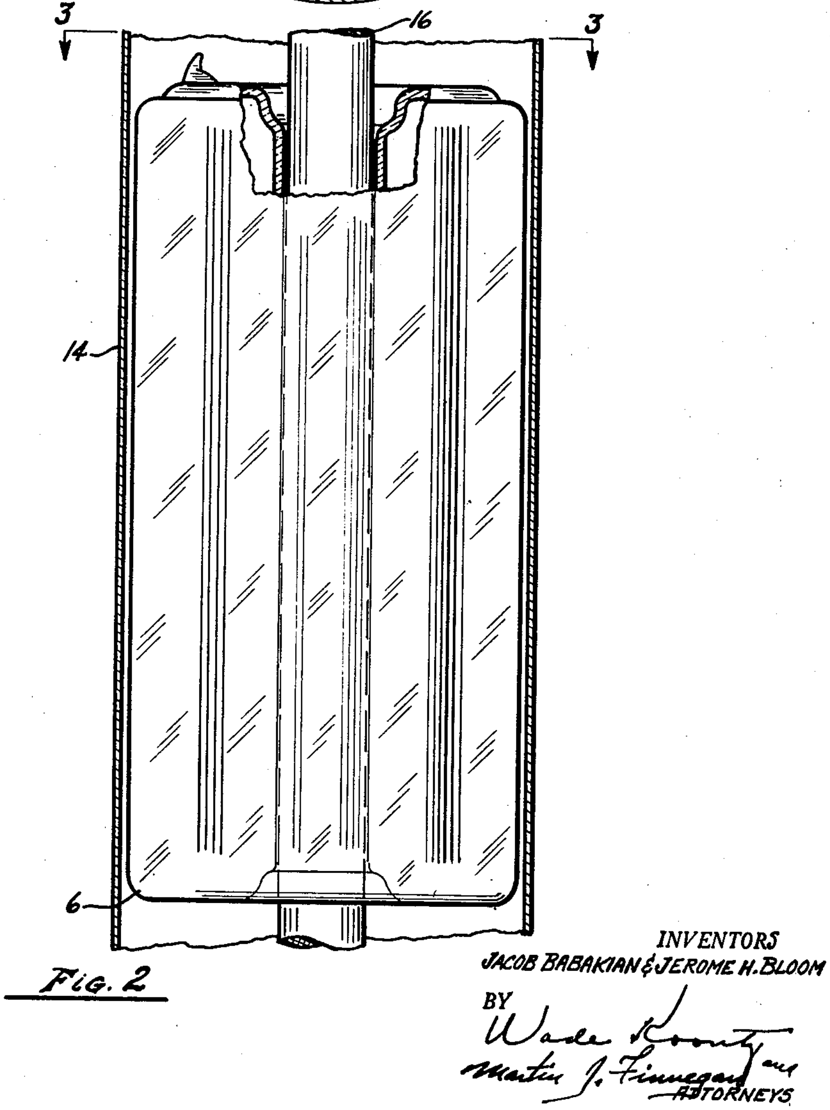
Figure 2 is a view, partly in section and partly in elevation, of certain components of the system of Figure 1, particularly those parts that are utilized to produce the required cycling of radio frequency energy to and from a single antenna.

Figure 1 shows a system for the transmission and reception of radio frequency energy utilizing a single antenna. Transmitter 1 generates radio frequency energy of large magnitudes. The energy is coupled during periods of transmission to the antenna 3 through main transmission line 10 which is a coaxial cable. During periods of reception, receiver 2 is coupled to antenna 3 through transmission line 13, transmit-receive device 4, transmission line 12, and main transmission line 10. Transmit-receive device 4 and anti-transmit-receive device 5 control the flow of radio frequency energy to and from antenna 3 in a manner to produce the transmission and reception cycles in proper timed relationship. Transmit-receive device 4 is comprised of half wavelength resonant coaxial cavity defined by outer conductor 15, variable capacitor 9, and electronic discharge device 7. Anti-transmit-receive device 5 is comprised of quarter wavelength coaxial cavity defined by outer conductor 14, variable capacitor 8, and electronic discharge device 6. The electronic discharge device, as shown in Figures 2 and 3, includes a substantially cylindrical glass envelope 6 disposed within outer conductor 14, said envelope 6 being closed at both ends except for an opening extending therethrough along its longitudinal axis for passage of coaxial type inner conductor 16 adapted to carry radio frequency energy to be controlled by said device. This device is filled with a gas such as argon which may be ionized and in addition thereto supplementary means, in either gaseous or solid form, may be added to decrease deionization time. The said deionization facilitating means, in one embodiment, is a combination of hydrogen and oxygen in the form of water vapor. Alternatively, a deionization solid such as quartz wool may be employed. Electronic discharge devices 6 and 7 are identical and are located in their respective outer conductors 14 and 15 in such a manner that they embrace the region of maximum voltage.

Figure 5:
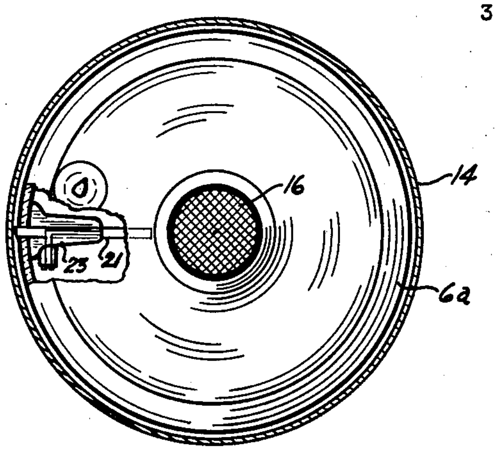
Figures 4 and 5 are, respectively, longitudinal and transverse views of an apparatus similar to that of Figures 2 and 3, but with keep-alive electrodes inserted therein.
Figure 4:
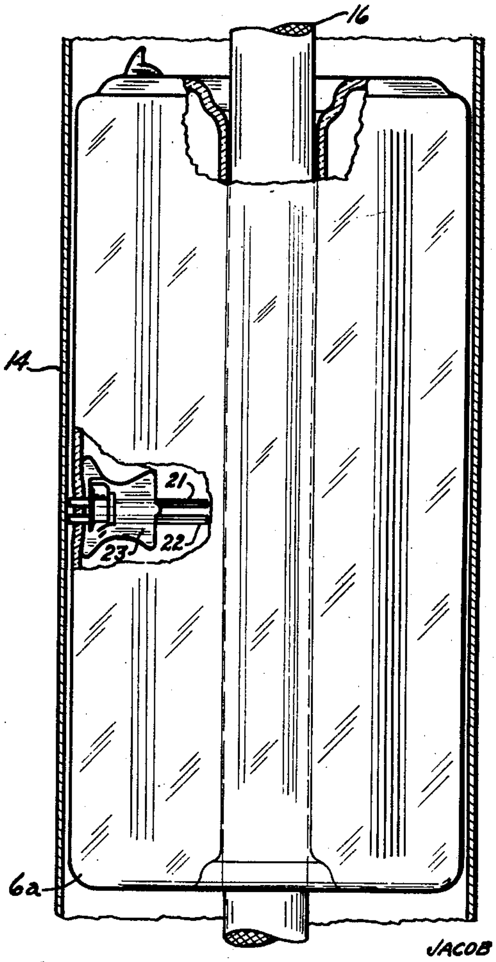

Figures 4 and 5 show an electronic discharge device which is identical to the device illustrated in Figures 2 and 3 except with an addition of keep-alive electrodes, as shown at 21 and 22 in Figures 4 and 5. These electrodes 21 and 22 are suitably mounted in a bushing 23 sealed into the side wall of the glass envelope 6a, with the outer ends of the electrodes emerging therefrom for connection thereto of the usual keep-alive voltage supplying conductors.

In actual use of the system, transmit-receive device 4 and antitransmit-receive device 5 are first tuned to resonance in the usual manner, by proper adjustment of capacitors 8 and 9. When transmitter 1 fires, electronic discharge device 7 ionizes, providing large areas of conduction both laterally and longitudinally between the inner and outer conductors of the resonant coaxial cavity defined by outer conductor 15, thus detuning the said cavity. As this widespread electron flow action occurs, the input impedance to the said cavity becomes very low because of the position of the input coupling line. This low impedance reflects back to main transmission line 10 as a high impedance and thus permits full power transmission to antenna 3. To assure attainment of this impedance relationship, transmit-receive device 4 is located at a point a quarter wavelength from main transmission line 10.

Similarly, anti-transmit-receive device 5 is located at a point a quarter wavelength toward the transmitter 1 from transmit-receive device 4, branched line 12, and also a quarter wavelength away from main transmission line 10. When transmitter 1 fires there occurs in discharge device 6 an action similar to that described above, due to the large area of conduction between the outer and inner conductors defining the coaxial cavity. Anti-transmit-receive device 5 is thereby detuned so that a low impedance is presented to the quarter wave line from the main transmission line 10. As seen at main transmission line 10, this appears as a high impedance. Energy is thus transmitted to antenna 3. During periods of reception, the anti-transmit device reflects a low impedance to main transmission line 10 so that a quarter wavelength away at the branch to transmit-receive device 5, a high impedance is seen looking toward transmitter 1. Therefore, energy from the antenna 3 is coupled through transmit-receive device 4 to receiver 2.

In referring above to the maximum voltage region embraced by the coaxial resonant cavity, it is to be understood that the actual point of initial electron discharge will shift back and forth along the length of the emitting surfaces due to variations in frequency or circuit constants. However, as the said electronic discharge device encompasses a large area in the said resonant coaxial cavity, the said device will always embrace the maximum voltage point and thus provide optimum performance.

While various embodiments of our invention have been disclosed as examples, it is understood that various modifications, within the conception of those skilled in the art, are possible without departing from the spirit of our invention or the scope of the claims.

We claim:

1. For use in a radio frequency energy transmit-receive system, a transmit-receive, anti-transmit-receive control device comprising an elongated glass envelope that is electrodeless except for keep alive electrodes, said glass envelope being closed at both ends except for a passageway extending therethrough in a longitudinal direction, said envelope thereby forming an annular emission chamber, a coaxial cavity resonator including a hollow cylindrical outer conductor and a cylindrical inner conductor symmetrically disposed therein, said outer conductor being closed at its ends to form a chamber resonant at a frequency determined substantially by its dimensions, variable capacitance means connected between said inner conductor and said outer conductor to assist in the precise control of the resonant frequency of said resonator, said annular emission chamber being completely enclosed in said resonator in such manner that said inner conductor passes through said longitudinal passageway of said annular emission chamber, and radio frequency energy means disposed entirely outside said emission chamber and coacting with said glass envelope and said cavity resonator to establish the resonance characteristics of said transmit-receive, anti-transmit-receive control device.

2. Apparatus as defined in claim 1, wherein the said glass envelope is filled with a mixture facilitating ionization and also serving as a deionization control factor.

3. Apparatus as defined in claim 1, wherein the said glass envelope contains argon admixed with a deionization control factor.

4. Apparatus as defined in claim 1, wherein the said glass envelope contains a mixture or argon and water vapor.

5. Apparatus as defined in claim 1, and including in said glass envelope a charge dissipating material distributed throughout the chamber to serve as a deionization control factor.

6. Apparatus as defined in claim 1, and including in said glass envelope a quantity of quartz distributed throughout the chamber in such a form as to serve as a deionization control factor.

7. Apparatus as defined in claim 1, wherein the said glass envelope contains argon and quartz wool.

8. Apparatus as defined in claim 1, and means mounted laterally of said glass envelope for supplying keep-alive voltages thereto.

9. For use in a radio frequency energy transmit-receive system, a transmit-receive, anti-transmit-receive control device comprising a coaxial cavity resonator having a cylindrical outer conductor and a cylindrical inner conductor symmetrically disposed therein said inner and outer conductors being closed at its ends to provide a chamber resonant at a frequency determined by its dimensions, and an elongated hollow glass envelope that is electrodeless except for keep-alive electrodes, said glass envelope being in engagement with said inner and outer conductors in such manner that said inner conductor is disposed in said hollow of said glass envelope, said envelope being sealed at its extremities and having a continuous unbroken contour, said inner and outer conductors coacting with said glass envelope to establish the resonant characteristics of said coaxial cavity.

10. Apparatus as defined in claim 9, wherein the said glass envelope is filled with a mixture facilitating ionization and also serving as a deionization control factor.

11. Apparatus as defined in claim 9, wherein the said glass envelope contains argon admixed with a deionization control factor.

12. Apparatus as defined in claim 9, wherein the said glass envelope contains a mixture of argon and water vapor.

13. Apparatus as defined in claim 9, and including in said glass envelope a charge dissipating material distributed throughout the chamber to serve as a deionization control factor.

14. Apparatus as defined in claim 9, and including in said glass envelope a quantity of quartz distributed throughout the chamber in such a form as to serve as a deionization control factor.

15. Apparatus as defined in claim 9, wherein the said glass envelope contains argon and quartz wool.

16. Apparatus as defined in claim 9, and means mounted laterally of said glass envelope for supplying keep-alive voltages thereto.

17. For use in a radio frequency energy transmit-receive system, a transmit-receive, anti-transmit-receive control device comprising an elongated glass envelope closed at both ends, said envelope thereby forming an annular emission chamber that is electrodeless except for keep-alive electrodes, means to produce emission in said electrodeless emission chamber in a cyclical fashion, said means being comprised of a coaxial cavity resonator having concentric inner and outer conductors connected at their ends, said inner conductor passing through said annular emission chamber and cyclic radio frequency energy means feeding said energy to said coaxial cavity resonator, each cycle of said energy causing emission in said electrodeless annular emission chamber thereby providing a path of conduction between said inner and outer conductors of said coaxial cavity resonator.

18. For use in a radio frequency energy transmit-receive system, a transmit-receive, anti-transmit-receive control device comprising a coaxial cavity resonator having a cylindrical outer conductor and a cylindrical inner conductor symmetrically disposed therein, said inner and outer conductor closed at its ends to form a chamber resonant at a frequency determined substantially by its dimensions, variable capacitive means connected between said inner and outer conductors to assist in the precise control of the resonant frequency of said resonator, an elongated hollow glass envelope that is electrodeless except for keep-alive electrodes, said glass envelope serving as annular emission chamber and being disposed between said inner and outer conductors in such manner that said inner conductor passes through said hollow of said elongated glass envelope, and cyclic radio frequency energy means coacting with said elongated hollow glass envelope and said coaxial cavity resonator to control the resonant characteristics of said resonator.

19. For use in a radio frequency energy transmit-receive system, a transmit-receive, anti-transmit-receive control device comprising a coaxial cavity resonator having concentric inner and outer conductors, closed at its ends to form a chamber resonant at a frequency determined substantially by its dimensions, variable capacitive means connected between said inner and outer conductors to control slightly said resonant frequency of said chamber, an elongated hollow glass envelope that is electrodeless except for keep-alive electrodes, said glass envelope serving as an annular emission chamber and being disposed between said inner and outer conductors in such manner so that said inner conductor passes through said hollow of said glass envelope, said glass envelope being filled with a mixture facilitating ionization and also serving as a deionization control factor, and means to feed said coaxial cavity resonator cyclic radio frequency energy, each cycle of said radio frequency energy causing emission in said electrodeless glass envelope thereby providing a path of conduction between said (inner and outer) conductors concentric of said cavity resonator to control the resonant characteristics of said resonator.

References Cited in the file of this patent

UNITED STATES PATENTS

| | | |
|---|---|---|
| 2,262,020 | Llewellyn | Nov. 11, 1941 |
| 2,410,656 | Herold | Nov. 5, 1946 |
| 2,425,328 | Jenks et al. | Aug. 12, 1947 |
| 2,496,865 | Fiske | Feb. 7, 1950 |
| 2,522,861 | Cork | Sept. 19, 1950 |
| 2,611,079 | Varela et al. | Sept. 16, 1952 |
| 2,641,702 | Cohen et al. | June 9, 1953 |
| 2,832,004 | Teeter | Apr. 22, 1958 |